J. R. MOFFITT.
Grain Separator.
No. 716. Reissued May 17, 1859.
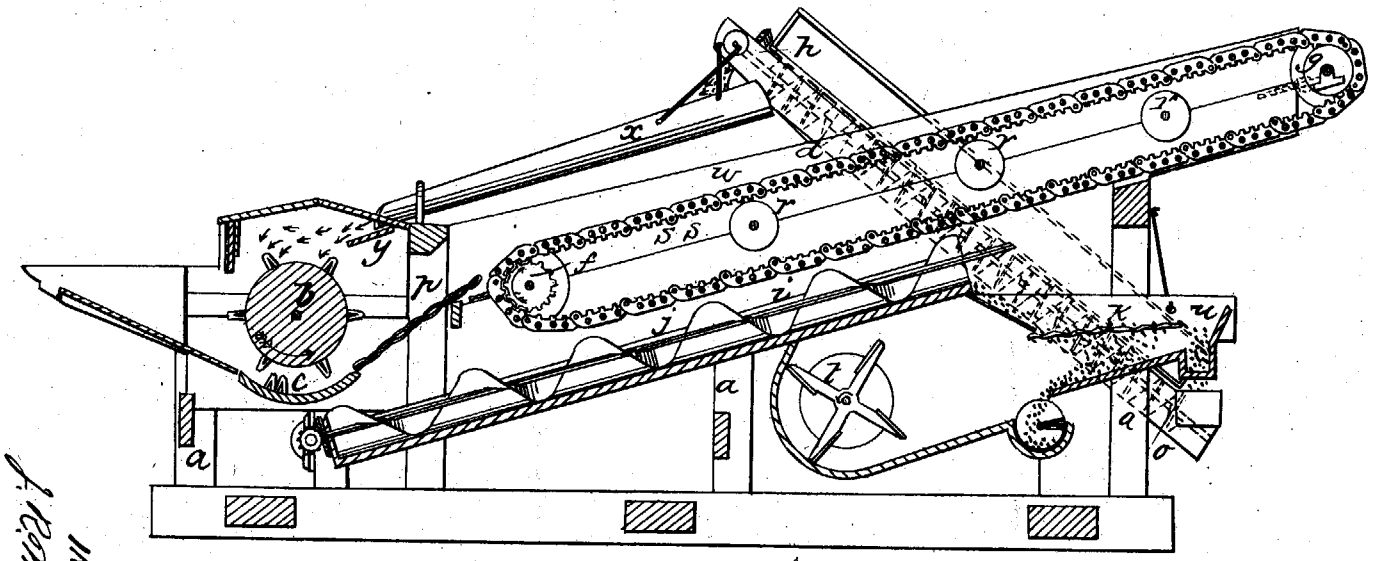
WITNESSES
INVENTOR
J. R. Moffitt
N. PETERS, Photo-Lithographer, Washington, D. C.

UNITED STATES PATENT OFFICE.

JOHN R. MOFFITT, OF PIQUA, OHIO.

IMPROVEMENT IN GRAIN-SEPARATORS.

Specification forming part of Letters Patent No. 9,432, dated November 30, 1852; Reissue No. 540, dated March 23, 1858; Reissue No. 716, dated May 17, 1859.

*To all whom it may concern:*

Be it known that I, JOHN R. MOFFITT, of Piqua, Miami county, Ohio, have invented new and useful Improvements in Grain-Separators; and I hereby declare the following to be a full and exact description of the same, reference being had to the accompanying drawing, making part of this specification.

The subject of my invention is an improved apparatus for returning the tailings to the thrashing-cylinder.

The accompanying drawing represents a vertical longitudinal section of a machine embodying my improvements.

The toothed thrashing-cylinder *b*, concave *c*, riddle *k*, and fan *t* may be of any suitable form. The straw-carrier is composed of endless chains *d*, connected by wooden slats or rods *w* about three-fourths of an inch in diameter and from an inch to an inch and a half apart. The links of the chains *d* are provided with teeth *s* or depressions, which engage with suitable driving-chain gears, *f*, for the purpose of imparting to the straw-carrier a positive motion without the necessity of its being tightly stretched, the objects of which are hereinafter explained. *g* are loose pulleys, carrying one end of the straw-carrier and adjustable in distance from the gears *f*. *r r* are rollers, supporting the upper side of the straw-carrier and assisting its agitation. *j* is a spiral conveyer, employed to forward to the winnowing apparatus all matters which fall through the straw-carrier into the trough *i*. *l* is a trough, in which the imperfectly-thrashed heads, &c., are deposited by the combined action of the riddles *k*, fan *t*, and tail-board *u*. *o* is an elevator, composed of a spiral flange having a pitch of about fifteen degrees, and mounted on a shaft journaled within the elevator-box *n*, which is set at an angle of somewhat less than forty-five degrees to the horizon and in such position as to receive matters deposited in the trough *l* and return them to the thrashing-cylinder by means of a trough, *x*, and chute-board *y*, or otherwise. The elevator-box *n* has a round bottom, and extends to a sufficient height above the upper side of the screw to prevent choking.

The operation is as follows: After passing through the thrashing apparatus *b c* the grain, chaff, &c., are by the tremulous shaking of the open straw-carrier rapidly separated from the straw, the latter passing over the tail of the machine, while the former falls through into troughs *i*, and are by screws *j* conveyed to the winnowing apparatus, where the grain, chaff, and tailings (or imperfectly-thrashed heads, &c.) are separated in customary manner, and the latter, being deposited in the elevator-box *n* are by the spiral elevator *o* returned in a continuous stream to the action of the thrashing-cylinder. Some provision is indispensably necessary to return the imperfectly-thrashed heads, &c., regularly and continuously to the thrashing apparatus, and the described spiral or screw elevator is believed to be the only effectual apparatus ever contrived for that purpose. The common elevator, composed of buckets on an endless belt, has been applied to this purpose, but is found inoperative when the grain is damp or when the amount of tailings is large, or is accompanied with straw, weeds, etc., which it is impossible entirely to separate therefrom. Under these circumstances the bucket elevator will invariably choke, whereas a screw-elevator constructed as described and of moderate pitch carries back to the thrashing-cylinder without trouble or fail everything which can come within its reach.

I am aware that it has been proposed to employ screw-elevators in connection with thrashing-machines for other purposes than that of my screw-elevator *o*, as seen in patents of A. Smith, April 11, 1848, and E. Snyder, June 11, 1850.

I claim as new and of my invention herein—

In combination with a receptacle in which the tailings are deposited by the winnowing apparatus, the arrangement of the screw-elevator *o* in relation to the thrashing-cylinder for the purpose of returning the tailings to be rethrashed, as set forth.

In testimony of which invention I hereunto set my hand.

J. R. MOFFITT.

Witnesses:
GEO. H. KNIGHT,
OCTS. KNIGHT.